(12) United States Patent
Shirley

(10) Patent No.: US 8,985,264 B2
(45) Date of Patent: Mar. 24, 2015

(54) PORTAL BOX

(71) Applicant: SXS Gear LLC, Flint, MI (US)

(72) Inventor: Grant I. Shirley, Poland, OH (US)

(73) Assignee: SXS Gear, LLC, Flint, MI (US)

( * ) Notice: Subject to any disclaimer, the term of this patent is extended or adjusted under 35 U.S.C. 154(b) by 0 days.

(21) Appl. No.: 14/262,964

(22) Filed: Apr. 28, 2014

(65) Prior Publication Data

US 2014/0230602 A1     Aug. 21, 2014

Related U.S. Application Data

(63) Continuation of application No. 14/055,051, filed on Oct. 16, 2013.

(51) Int. Cl.
| | |
|---|---|
| *B60B 35/16* | (2006.01) |
| *B60K 17/30* | (2006.01) |
| *F16H 57/022* | (2012.01) |
| *B60B 35/00* | (2006.01) |
| *B60K 17/04* | (2006.01) |
| *F16H 57/02* | (2012.01) |

(52) U.S. Cl.
CPC ............ *B60K 17/303* (2013.01); *F16H 57/022* (2013.01); *F16H 2057/02043* (2013.01); *B60B 35/001* (2013.01); *B60K 17/043* (2013.01); *B60Y 2200/124* (2013.01)
USPC ........................................ 180/371; 74/606 R

(58) Field of Classification Search
CPC .. B60B 35/001; B60B 35/122; B60K 17/043; B60K 17/306; B60K 17/303
USPC ............. 180/371, 255; 301/132, 137; 74/607, 74/606 R
See application file for complete search history.

(56) References Cited

U.S. PATENT DOCUMENTS

| | | | | |
|---|---|---|---|---|
| 4,344,501 | A * | 8/1982 | Jerry et al. ..................... | 180/253 |
| 4,733,743 | A * | 3/1988 | Weiss et al. .................... | 180/255 |
| 7,909,127 | B1 * | 3/2011 | Pionke .......................... | 180/252 |
| 8,118,133 | B2 | 2/2012 | Armfield | |
| 8,640,812 | B2 * | 2/2014 | Bindl ............................ | 180/255 |
| 2004/0178014 | A1 * | 9/2004 | Groves et al. ................. | 180/337 |
| 2006/0207384 | A1 * | 9/2006 | Hardy et al. ................... | 74/640 |
| 2012/0181850 | A1 | 7/2012 | Armfield | |
| 2013/0093154 | A1 * | 4/2013 | Cordier et al. ......... | 280/124.109 |

\* cited by examiner

*Primary Examiner* — Keith Frisby
(74) *Attorney, Agent, or Firm* — Raggio & Dinnin, P.C.

(57) ABSTRACT

A kit for raising and increasing wheel torque of an off road four wheel vehicle comprising four portal boxes, each portal box being associated with an individual one of the vehicle wheels, the portal boxes enclosing identical gear sets and associated bearings, each portal box being adapted to receive the output of an axle constant velocity joint and having an output shaft projecting therefrom, a set of four metal backing plates for joining the portal boxes to the suspension arms of the vehicle, the backing plates being substantially identical, the backing plates each having inwardly extending mounting brackets for attaching to upper and lower suspension arm parts.

20 Claims, 4 Drawing Sheets

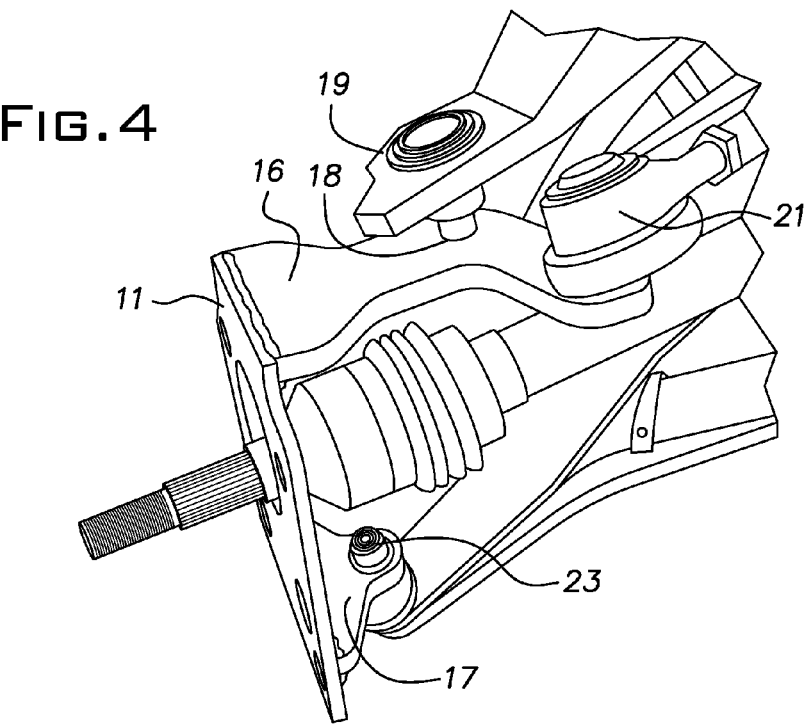
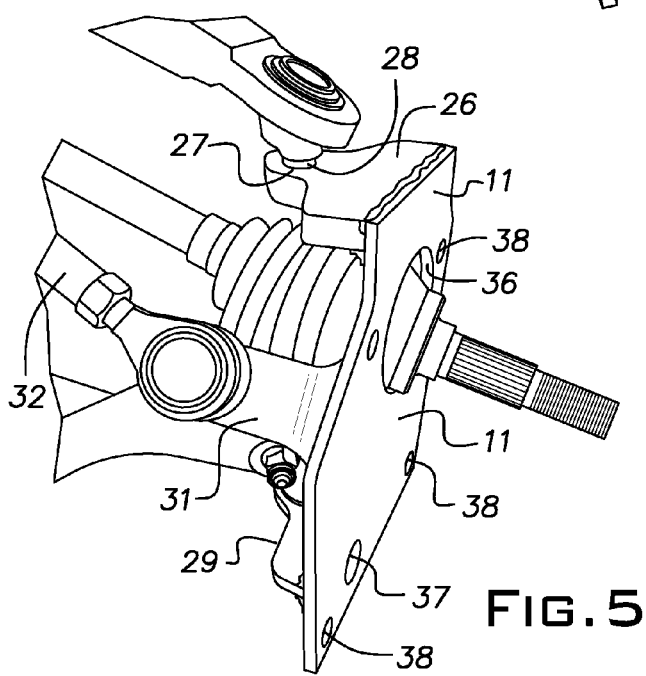
FIG. 4
FIG. 5

PORTAL BOX

BACKGROUND OF THE INVENTION

The invention relates to a novel portal box construction for use in light off road vehicles.

PRIOR ART

Off road vehicles in the form of ATV's (all-terrain vehicles) and UTV's (utility task vehicles) are produced by numerous manufacturers. Purchasers and users of these vehicles frequently desire to fit them with larger tires to give them greater agility in traversing rough terrain. To fit larger tires on these vehicles, it is common to install a lift kit to raise the vehicle body to make room for the larger tires and to increase ground clearance. Typically, a lift kit will adversely affect constant velocity (CV) joint angles and necessitate replacement of the original equipment axles, including CV joints. Even with these upgrades, steering geometry can be compromised and bump steer, for example, can be introduced. Still further, the final drive ratio measured as available force at the thread surface of the oversize tires is reduced in proportion to the size increase. The foregoing reveals a need for an aftermarket system to mount oversize wheels on off road vehicles that avoids the disadvantage of ordinary lift kits.

SUMMARY OF THE INVENTION

The invention provides a portal box system for light off road vehicles that is simple, low in cost, and readily adapted for use on vehicles of different manufacturers. The disclosed portal box system comprises a universal backing plate and a narrow profile two-part housing in which is mounted a torque and height increasing gear train. The same backing plate with proper brackets attached can be used at all four wheels of a specific vehicle and with different sets of brackets on several different vehicles. The same left and right housings are used for front and rear wheels of a vehicle to which the system is applied. The same gear train can be used at all of the wheels and only the input gear may be modified to suit a particular brand of vehicle.

BRIEF DESCRIPTION OF THE DRAWINGS

FIG. 4 is a fragmentary perspective view of a left front axle and suspension arms of the vehicle of FIG. 1 on which is assembled a backing plate and associated suspension mounting brackets; and FIG. 5 is a view similar to FIG. 4 of the left rear axle, associated backing plate and corresponding mounting brackets.

DESCRIPTION OF THE PREFERRED EMBODIMENT

Figure 1:
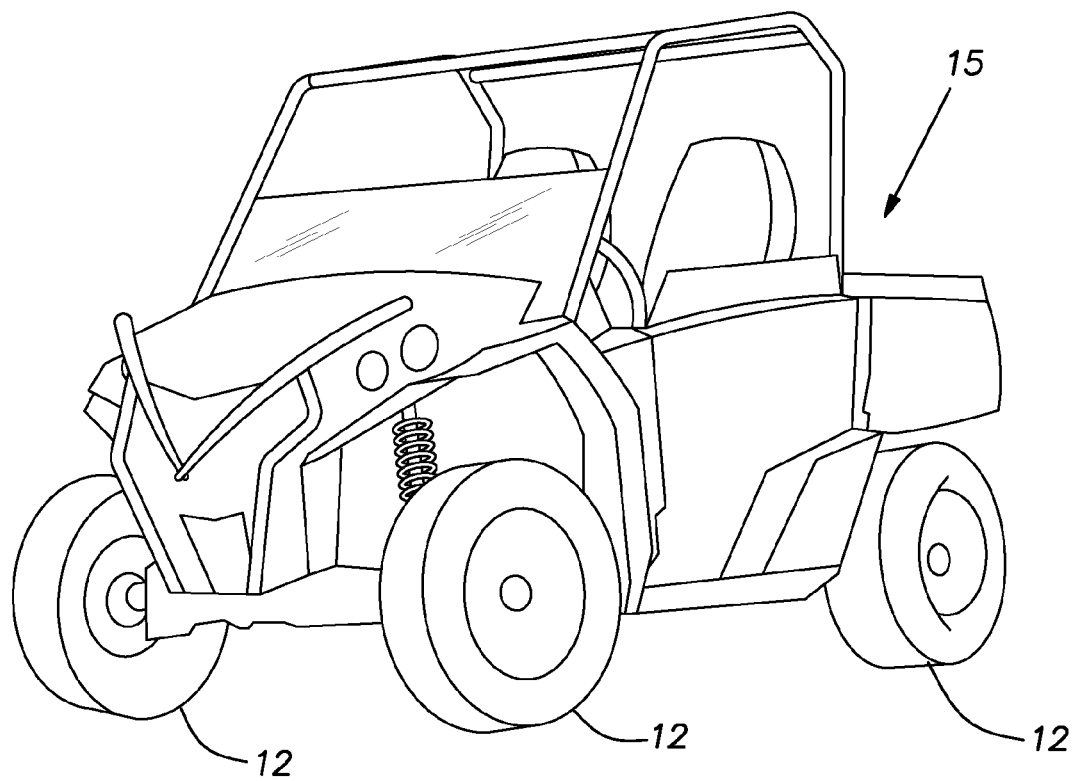
FIG. 1 is a perspective view of a light off road vehicle to which the invention is applied.

The invention is useful in lifting the chassis and increasing the wheel torque of light off road four-wheel drive vehicles such as the UTV illustrated in FIG. 1. The illustrated vehicle is originally manufactured by John Deere and marketed as a Model RSX 850i. It will be appreciated by those skilled in the art that the invention is applicable to vehicles of other manufacturers.

Figure 2:
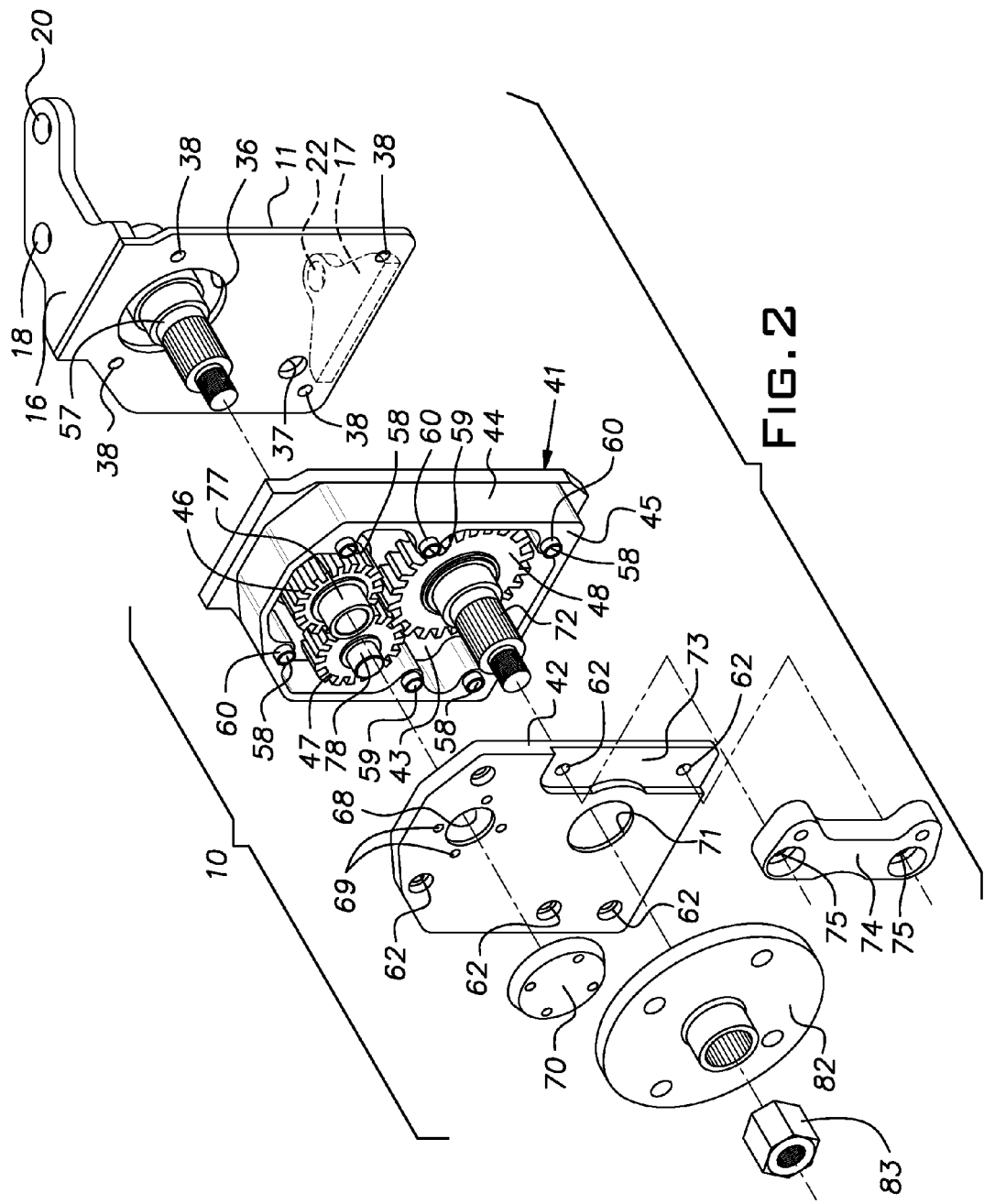
FIG. 2 is a somewhat schematic exploded isometric view of a portal box system employing the invention.
Figure 3:
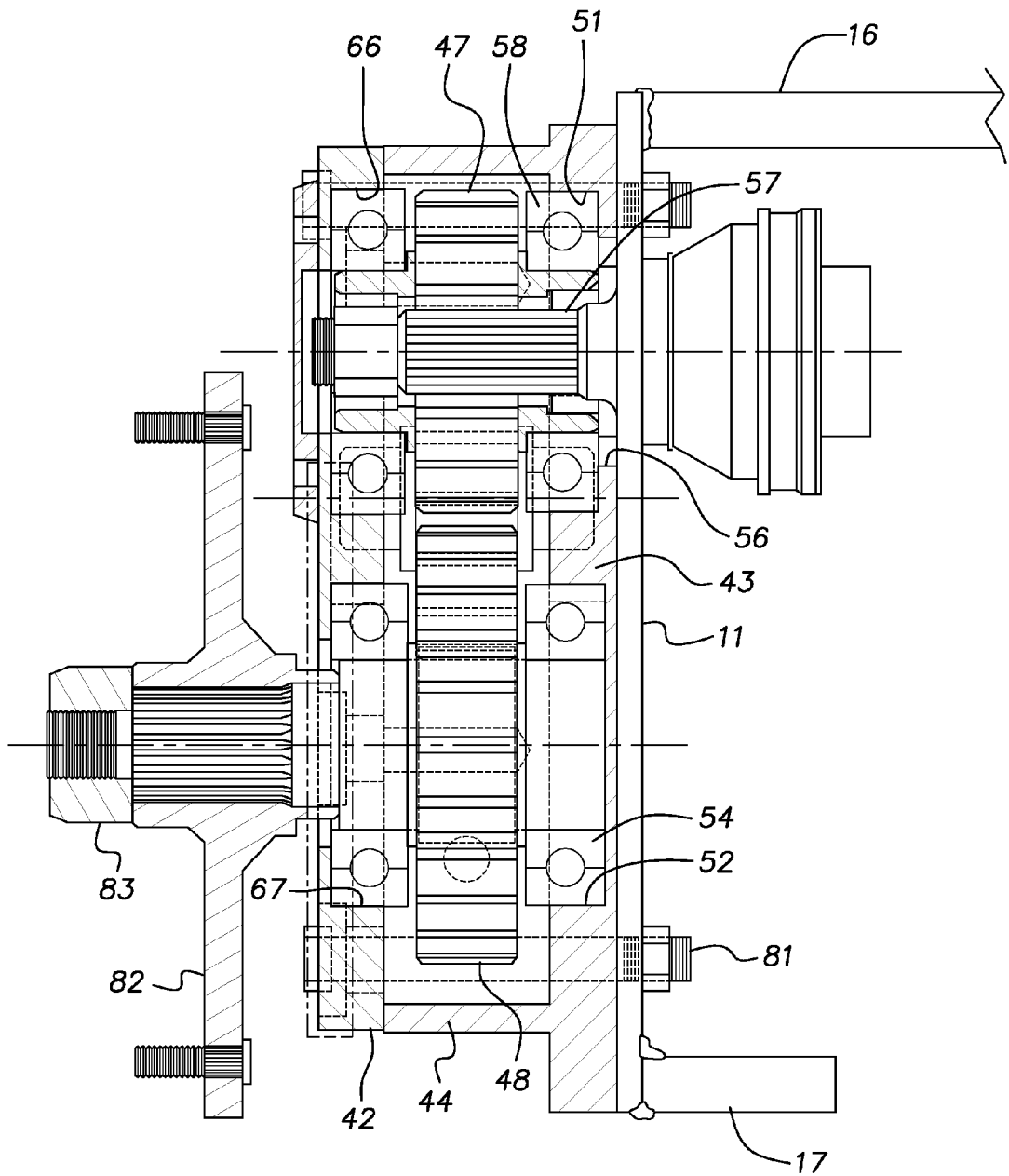
FIG. 3 is a somewhat schematic cross-sectional view at one axle of a portal box system constructed in accordance with the invention.

The invention provides a portal box system, available as a kit, that replaces a vehicle's original wheel hub assemblies. The kit can include four portal boxes 10 and associated backing plates 11. FIGS. 2 and 3 illustrate a typical portal box 10 and backing plate 11. The backing plate 11 at each wheel 12 (FIG. 1) can be identical or essentially identical. Each backing plate 11 is provided with upper and lower mounting brackets 16, 17. Preferably, the backing plate 11 is a steel plate, for example, ¼ inch thick. The brackets 16, 17, made of ½ inch steel plate, for example, are attached to the plate 11 preferably by welding.

Referring to FIG. 4, the upper bracket 16 can have a hole 18 for attaching an upper ball joint 19 and a hole 20 (FIG. 2) for attaching a steering rod end 21. Similarly, the lower bracket 17 has a hole 22 for securing a lower ball joint stud 23.

Referring to FIG. 5, at a rear axle, an upper bracket 26 has a hole 27 for receiving an upper ball joint stud 28 and a lower bracket 29 has a hole for receiving a lower ball joint stud. A third bracket 31 welded to the backing plate 11 receives the stud of a rod end of a track bar 32.

The backing plate 11 and associated mounting brackets are preferably planar elements cut or stamped from steel plate. It will be seen that the backing plate 11, which has four major perimeter edges that lie in a common imaginary rectangle, can be reversed side-for-side to serve both sides of the vehicle 15. The backing plate 11 has the same orientation on each side of the vehicle 15. Similarly, the mounting brackets 16, 17, 26, 29 and 31 can be reversed when they are attached to a respective backing plate 11 to serve the opposite side of the vehicle 15.

A large clearance hole 36 is cut in the backing plate 11 for the output shaft of the CV joint of the vehicle's axle or half shaft. A small clearance hole 37 is provided in the backing plate 11 for access to a lubricant fill plug in an inboard face of the portal box 10. Four spaced portal box mounting bolt holes 38 are provided about the periphery of the plate 11.

The portal box housing comprises a case 41 and a cover 42. Preferably, both the case 41 and cover 42 are machined metal bodies, preferably of high strength 6061 aluminum. The illustrated case 41 is machined from a solid block of spaced aluminum; alternatively, the case can be cast or forged to a rough configuration, and then finish machined. The case 41 has a rear or inboard main wall 43 and an integral peripheral wall 44. A face 45 of the peripheral wall 44 lies in a plane parallel to the plane of the main wall 43. The peripheral wall 44 forms a space for receiving meshed spur gears 46-48. Circular recesses 51, 52 are formed in an inside face of the case wall 43 to receive and support bearings 53, 54 that rotationally support respective gears 46-48. A recess and bearing for a gear 47 exists in the wall 43 but it is not seen in the plane of FIG. 3. An aperture 56 in the case wall 43 receives the CV output shaft 57 of an associated axle. The peripheral wall 44 has a set of through holes 58 alignable with the mounting holes 38 in the backing plate 11. Internally threaded holes 59 are provided in the peripheral wall 44 at mid-height. All of the holes 58, 59 have an integral concentric boss 60 extending outwardly of the peripheral wall face 45.

The cover 42 is a flat plate proportioned to mate with the face 45 of the peripheral case wall 44. The cover has holes 62 that fit closely over the bosses 60 and thereby register the cover with the case 41. An inside face of the cover 42 is machined with recesses (FIG. 3) to receive and support bearings 66, 67 in alignment with the recesses 51, 52 in the case wall 43. The recess for the bearing of the gear 47 is not seen in the plane of FIG. 3. At an upper region, the cover 42 has a clearance hole 68 for receiving the outboard end of the CV shaft 57. Tapped holes 69 for screws (not shown) hold a cap 70 over the hole 68. A clearance hole 71 in the cover 42 concentric with the bearing recess 67 allows passage of an output shaft 72. At its outer face, the cover 42 is provided with an elongated recess 73 for receiving a brake caliper bracket (FIG. 2). The bracket 74 has holes 75 that align with two of the holes 62 in the cover 42 and one of the holes 38 in the backing plate 11.

The upper gear 46 is the input gear to the gear train or set. The gear 46 has an internal spline cut to match the exterior spline on the CV output shaft 57 of the vehicle 5. The gear 46 has integral hollow stub shafts 77 on both of its sides. The stub shafts 77 are supported in bearings 53. An idler gear 47 has coaxial stub shafts 78 (only one is seen in FIG. 2) supported in bearings in the case wall 43 and cover 42. The output gear 48 is internally splined and fits on an external spline of the output shaft 72. The output shaft is rotationally supported in the bearings 54, supported in the case wall 43 and cover 42. It will be seen that the centers of the input gear 46 and output shaft 72 are vertically aligned so that a wheel 12 mounted on the output shaft is dropped vertically from the original vehicle axle represented by the CV output shaft 57. Moreover, the pitch diameter of the output gear 48 is substantially larger than the input gear 46 so as to multiply the torque available at the output shaft 72.

The cover 42, case 41, and backing plate 11 are held together by bolts 81 assembled through respective holes in these components. Commercially available seals (not shown) are provided at the case wall aperture 56 and the cover hole 71 to exclude dirt, dust, and to contain lubricant within the case 41. A gasket is provided between the cover 42 and case face 45; similarly, a gasket is provided between the cap 70 and cover 42. An internally splined wheel hub 82 is retained on an external spline of the output shaft 72 by a nut 83 threaded on the distal end of the output shaft.

The portal boxes 10 on the left front and left rear axles are identical; the front and rear portal boxes 10 on the right side are identical to each other and are mirror images of the portal boxes on the left. Internally, the gears 46-48 are identical on the left and right sides of the vehicle 5.

It is expected that the disclosed portal box system can be used with a variety of popular light off road vehicles offered by different manufacturers. The portal boxes 10 are readily adapted to the vehicles by providing suitable brackets as substitutes for he disclosed brackets 16, 17, 26, 29, and 31 or their equivalents, that can mate with the suspension arms of a particular vehicle. The backing plate 11 is exceptionally versatile since it can accept essentially any suspension, steering and stabilizing bracketry existing on a particular manufacturer's vehicle.

It should be evident that this disclosure is by way of example and that various changes may be made by adding, modifying or eliminating details without departing from the fair scope of the teaching contained in this disclosure. The invention is therefore not limited to particular
the backing plate 11 and associated mounting brackets are preferably following claims are necessarily so limited.

What is claimed is:

1. A portal box assembly for mounting a wheel of an off road vehicle comprising a steel backing plate, a cover plate and a portal box, the backing plate being formed of a flat plate and provided with a flat mounting surface and a pair of vertically spaced mounting brackets extending away from the mounting surface, a surface of the flat plate engages an end of each of the mounting brackets, the brackets including holes for connection with a suspension of a particular vehicle, the portal box, the cover plate and backing plate having aligned holes for receiving bolts for mounting the cover plate and the portal box to the backing plate, the portal box containing input, idler and output gears, the portal box having an operational orientation in which the output gear is below the input gear, the mounting brackets being separately formed to be suitable to the particular vehicle prior to mounting onto the backing plate.

2. A portal box assembly as set forth in claim 1, wherein the portal box includes a case that abuts the backing plate and provides a cavity for receiving said gears.

3. A portal box assembly as set forth in claim 1, wherein the cover plate being arranged to hold bearings for rotational support of said gears.

4. A portal box assembly as set forth in claim 3, wherein said cover plate includes an elongated recess for receiving a brake caliper bracket.

5. A portal box assembly as set forth in claim 3, wherein said case and cover plate have mating planar faces parallel to said backing plate.

6. A portal box assembly as set forth in claim 5, wherein said case is machined from an aluminum block.

7. A portal box assembly as set forth in claim 6, wherein said block is a rectangular parallelepiped.

8. A portal box assembly as set forth in claim 3, wherein said case includes recesses carrying bearings for supporting said gears.

9. A portal box assembly as set forth in claim 1, wherein the mounting brackets are welded on the backing plate at locations determined by a vehicle on which the portal box is installed.

10. A portal box assembly as set forth in claim 1, wherein said backing plate has a clearance hole for an output spline of a CV joint.

11. A portal box assembly as set forth in claim 10, wherein the clearance hole lies within an imaginary boundary defined by said aligned holes and said backing plate.

12. A portal box assembly as set forth in claim 10, wherein said backing plate has a second clearance hole, the second clearance hole is smaller than the clearance hole.

13. A portal box assembly as set forth in claim 10, wherein said backing plate has a bracket including a hole for attaching a steering rod end.

14. A portal box assembly as set forth in claim 1, wherein said input gear has an internal spline for receiving an external spline of a CV joint of a vehicle axle.

15. A kit for raising an off road four wheel vehicle chassis and increasing wheel torque of an off road four wheel vehicle comprising four portal boxes, each portal box being associated with an individual one of the vehicle wheels, the portal boxes on a left front and a left rear axle are identical, the portal boxes on a right front and a right rear axle are identical, the portal boxes enclosing identical gear sets and associated bearings, each portal box being adapted to receive the output of an axle constant velocity joint and having an output shaft projecting therefrom, a set of four metal backing plates for joining the portal boxes to suspension arms of the vehicle, the backing plates being universal, the backing plates each having inwardly extending mounting brackets for attaching to upper and lower suspension arm parts.

16. A kit as set forth in claim 15, wherein the mounting brackets of one side of the vehicle are mirror images of the mounting brackets of the other side of the vehicle.

17. A kit as set forth in claim 15, wherein said mounting brackets are welded on said backing plates.

18. A kit as set forth in claim 15, wherein said portal boxes and backing plates have alignable bolt holes for receiving bolts that hold the portal boxes on the mounting plates.

19. A kit as set forth in claim 18, wherein said portal boxes include a hollow case and a cover plate, common bolts holding said cover plate on said case and said portal box to said backing plate.

20. A kit as set forth in claim 15, wherein said portal boxes and backing plates have profiles with edges aligning with an imaginary rectangle.

* * * * *